United States Patent
Monajemi et al.

(10) Patent No.: US 11,387,977 B2
(45) Date of Patent: Jul. 12, 2022

(54) IMPLICIT FULL DUPLEX COMMUNICATION IN 802.11AX WIRELESS NETWORKS

(71) Applicant: Cisco Technology, Inc., San Jose, CA (US)

(72) Inventors: Pooya Monajemi, San Jose, CA (US); Brian Hart, Sunnyvale, CA (US); Matthew Aaron Silverman, Shaker Heights, OH (US); Gautam D. Bhanage, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

(21) Appl. No.: 16/801,944

(22) Filed: Feb. 26, 2020

(65) Prior Publication Data
US 2021/0266137 A1  Aug. 26, 2021

(51) Int. Cl.
*H04L 5/14* (2006.01)
*H04W 74/08* (2009.01)
*H04W 52/28* (2009.01)

(52) U.S. Cl.
CPC ............ *H04L 5/14* (2013.01); *H04W 52/283* (2013.01); *H04W 74/0816* (2013.01)

(58) Field of Classification Search
CPC ....................................................... H04L 5/14
See application file for complete search history.

(56) References Cited

U.S. PATENT DOCUMENTS

| 7,020,451 | B2 | 3/2006 | Sugar et al. | |
|---|---|---|---|---|
| 2017/0223665 | A1* | 8/2017 | Chun | H04B 7/0695 |
| 2018/0091284 | A1* | 3/2018 | Min | H04L 5/0037 |

OTHER PUBLICATIONS

Cisco Systems, Inc., "802.11k Assisted Roaming", 802.11r, 802.11k, and 802.11w Deployment Guide, Cisco IOS-XE Release 3.3, Jan. 25, 2014, 4 pages.
Gilb, James et al., "802.11 Full Duplex", doc.: IEEE 802.11-18/0191r1, Jan. 15, 2018, 19 pages.
Xin, Yan et al., "Technical Report on Full Duplex for 802.11", doc. IEEE 802.11-18/0498r8, Sep. 14, 2018, 43 pages.
Chen, Weiteng et al., "Off-Path TCP Exploit: How Wireless Routers Can Jeopardize Your Secrets", Proceedings of the 27th USENIX Security Symposium, 978-1-939133-04-5, https://www.usenix.org/conference/usenixsecurity18/presentation/chen-weiteng, Aug. 15-17, 2018, 19 pages.

* cited by examiner

*Primary Examiner* — James P Duffy
(74) *Attorney, Agent, or Firm* — Edell, Shapiro & Finnan, LLC

(57) ABSTRACT

A wireless access point device is full-duplex capable and serves wireless communication for at least first and second wireless client devices. The wireless access point device sends to the first wireless client device a trigger frame that causes the first wireless client device to send an uplink transmission to the wireless access point after a first time interval. The wireless access point device waits a second time interval after the first wireless client is expected to begin sending the uplink transmission. The wireless access point device receives the uplink transmission from the first wireless client device. After the second time interval, and while receiving the uplink transmission from the first wireless client device, the wireless access point device sends to the second wireless client device a downlink transmission that overlaps at least partially in frequency and time with the uplink transmission from the first wireless client device.

20 Claims, 7 Drawing Sheets

IMPLICIT FULL DUPLEX COMMUNICATION IN 802.11AX WIRELESS NETWORKS

TECHNICAL FIELD

The present disclosure relates to wireless communication.

BACKGROUND

Full-duplex (FD) communication solutions have been considered for some time in the wireless local area network (WLAN) industry. In full-duplex communication, devices can be transmitting and receiving at the same time. Thus, full-duplex communication results in a much more efficient use of the spectrum.

DESCRIPTION OF EXAMPLE EMBODIMENTS

Overview

Figure 1:
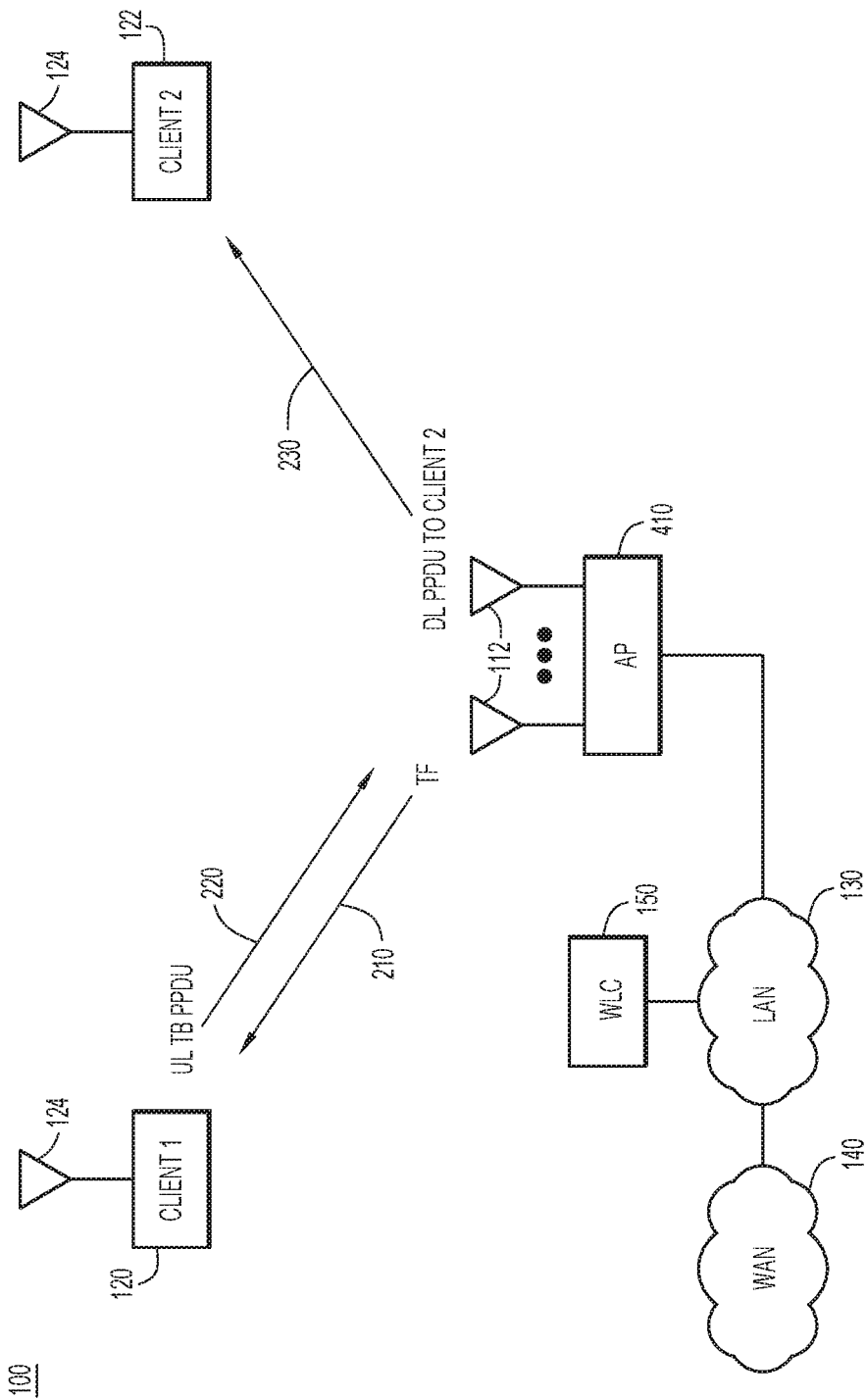
FIG. 1 is a diagram of a wireless local area network that includes a wireless access point configured to perform implicit full-duplex communication with two wireless client devices, according to an example embodiment.

In one embodiment, a wireless access point device is full-duplex capable and serves wireless communication for at least a first wireless client device and a second wireless client device. The wireless access point device sends to the first wireless client device a trigger frame that causes the first wireless client device to send an uplink transmission to the wireless access point after a first time interval. The wireless access point device waits a second time interval after the first wireless client is expected to begin sending the uplink transmission. The wireless access point device receives the uplink transmission from the first wireless client device. After the second interval of time, and while receiving the uplink transmission from the first wireless client device, the wireless access point device sends to the second wireless client device a downlink transmission that overlaps at least partially in frequency and time with the uplink transmission from the first wireless client device.

EXAMPLE EMBODIMENTS

In full-duplex communication (wired or wireless), two devices are transmitting and receiving at the same time. Recently a topic interest group was formed in IEEE to consider developing a specification for full-duplex solutions in WLANs. This group concluded its work with no prospect of forming a task group. Therefore, at this point, FD does not seem likely to be specified by IEEE for use in WLANs for several years. Even if a FD specification is developed in the future, adoption of the specification by client device manufacturers is likely to take several more years, during which many client devices with no FD support will continue to dominate WLAN deployments.

Presented herein are techniques in which a WLAN access point (AP) (or any suitably configured/equipped wireless device) that has hardware and/or software making it FD-capable may operate concurrent transmissions and receptions with no standard/specification support requirements for a client/station (STA) using existing IEEE WLAN technology, such as IEEE 802.11ax, for example. As a result, using the techniques presented herein, there is no need for a new specification to enable FD communication in a WLAN.

In accordance with the techniques presented herein, no assumptions or requirements are made with respect to the capabilities of clients/STAs. In other words, the clients/STAs need not have any specific hardware or software to enable FD-communication. The AP, however, has hardware and/or software that enables it to be FD-capable. This means that the AP has the capability to receive while transmitting at the same time on the same channel, as well as the capability to cancel self-interference (caused by receiving energy from its own transmission) by looping the transmitted signal back to the receiver.

Accordingly, methods are provided for an AP to operate in a full-duplex mode, concurrently servicing (different) clients in the uplink (UL) and the downlink (DL). Moreover, methods are provided to identify suitable clients for using this full-duplex scheme.

Full-duplex communication may not always be the best use of spectral resources, but there are situations where full-duplex communication is beneficial. For example, one such situation is when clients have low-latency traffic on both the DL and UL, such as immersive virtual reality (VR) use cases and some Ultra-Reliable Low-Latency Communication (URLLC) use cases. According to 3GPP Release 15 5G-NR, URLLC is a set of features that provide low latency and ultra-high reliability for mission critical applications such as industrial internet, smart grids, remote surgery and intelligent transportation systems.

Basic Method

Reference is now made to FIG. 1. FIG. 1 illustrates an example of a WLAN 100 that includes an AP 110 and two clients 120 and 122. The AP 110 may include one or a plurality of antennas 112 to transmit signals to the clients 120 and 122 and detect transmissions from the clients 120 and 122. The clients 120 and 122 each include at least one antenna 124. Client 120 is arbitrarily referred to as "client 1" and client 122 is arbitrarily referred to as "client 2". The AP 110 has connectivity to a local area network (LAN) 130, which in turn may have connectivity to a wide area network (WAN) or Internet 140. The AP 110 may be under the control of a management entity, such as a wireless LAN controller (WLC) 150 that is connected to the LAN 130.

Figure 2:
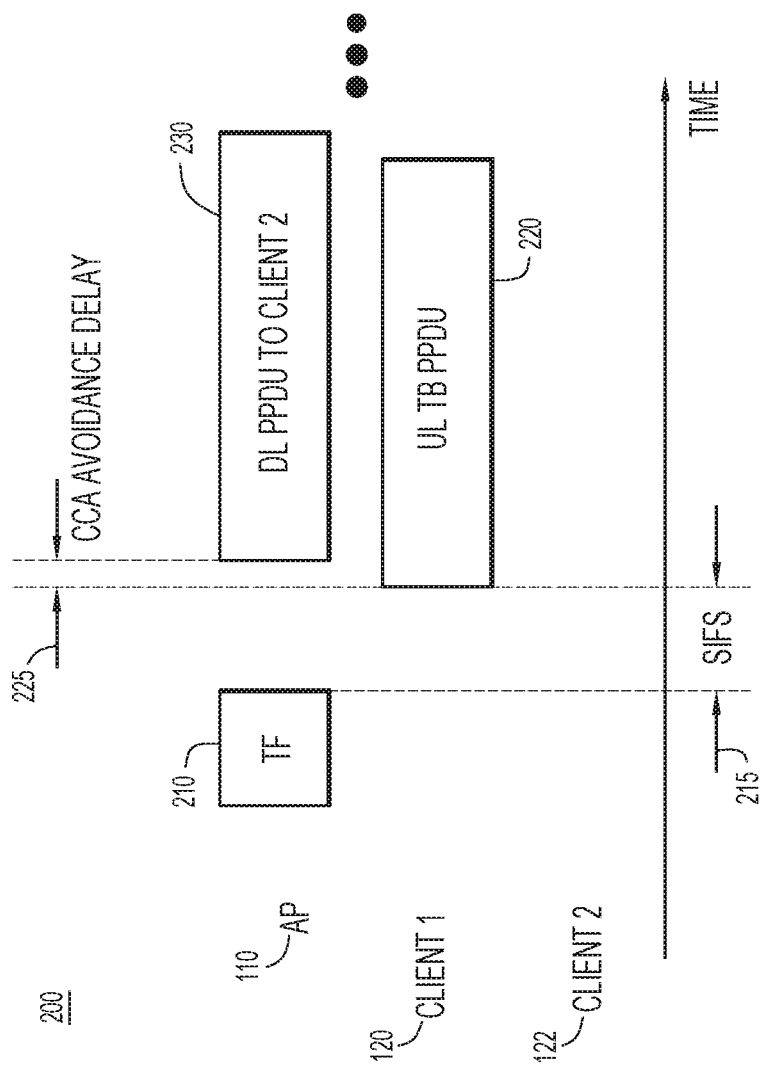
FIG. 2 illustrates a sequence of transmissions initiated by the access point to invoke implicit full-duplex communication with two wireless client devices for the example wireless local area network arrangement shown in FIG. 1, according to an example embodiment.

Turning now to FIG. 2, with continued reference to FIG. 1, a triggered process 200 is described in which full-duplex communication is not concurrently happening between two nodes, but rather between at least 3 nodes. One client/STA, e.g., client 120, transmits on an uplink to the AP 110. While the AP 110 is receiving that uplink transmission from client 120, and at the same time, the AP 110 is transmitting on the downlink to another client/STA, e.g., client 122. This is called asymmetric full duplex communication.

The frame sequence for the triggered process 200 is as follows. The AP 110 starts by sending a trigger frame (TF) at 210 to client 120. The TF causes the client 120 to send an UL transmission to the AP. The client 120, upon receiving the TF, waits a first time interval 215 corresponding to the so-called Short Interframe Space (SIFS), and then begins transmitting its UL transmission, referred to as an UL trigger-based (TB) Physical Layer Convergence Procedure (PLCP) Protocol Data Unit (PPDU), at 220. The SIFS time interval is the amount of time for a wireless device to process a received frame and respond with a response frame.

After a second time interval 225, called a delay interval or a Clear Channel Assessment (CCA) avoidance delay, and thus slightly after the start of the UL transmission 220 from client 1, the AP 110 initiates a DL transmission 230 to client 122. This delay interval 225 is added in order to ensure that client 120, when doing CCA before initiating the UL transmission 220, does not back off due to receiving energy from the AP's DL transmission 230. Thus, this delay interval 225 ensures that the AP 110 does not start transmitting before client 120 has started its UL transmission 220 on the uplink. The delay interval 225 may vary depending on a variety of factors, but a range of 4 microseconds to 9 microseconds is one example. This process may continue as shown in FIG. 2 in a similar manner to trigger client 1 to send an UL transmission while the AP sends a DL transmission to client 2, or vice versa, whereby the AP triggers client 2 to send an UL transmission while the AP sends a DL transmission to client 1. Moreover, this process could be extended to more than two clients.

The IEEE imposes medium sensing, called CCA Energy Detect (CCA-ED), to be performed by triggered clients for longer frames. The ED threshold is used to detect any other type of radio frequency (RF) transmissions during CCA. For shorter frames, however, CCA may not be required and therefore the delay interval 225 may be ignored when the uplink transmission from a client is relatively short. Specifically, if the length or duration of the UL transmission 220 from client 120 is greater than a certain threshold, then the AP 110 may send a signal indicating to the client 120 that it needs to perform energy detect before responding to the TF 210. The AP itself signals to the triggered client if CCA needs to be performed or not. The criteria according to which the signal is set by the AP is defined in the standard specification. In short, the AP has to signal for CCA check if the response is longer than 128 microseconds, OR if the response will include an ACK to a data frame that is transmitted along with the trigger frame and is longer than 584 microseconds.

If the client detects energy on the medium based on an ED threshold of −62 dBm, the client 120 does not send the UL transmission at that time. The length of the response is specified in the trigger frame and the client fills a time interval corresponding to the length specified in the trigger frame even if it does not have a need to do so to complete an uplink transmission. Since the AP 110 knows the length of a trigger-based response, the AP 110 may decide whether or not it needs to wait a period of time corresponding to the CCA avoidance delay interval 225 before initiating the DL PPDU to client 122.

The UL transmission 220 (UL TB PPDU) from client 120 may cause interference at client 122 depending on the RF proximity to client 120. As a result, it may be desirable to ensure that there is a minimum level of separation between the target clients, i.e. client 120 and client 122. Several methods to determine a measure of the separation between clients are described further below. In deployments in which the AP has external antennas pointing in different directions, client pairs receiving signals from different antennas of the AP are good candidates for the scheme depicted in FIGS. 1 and 2. The "measure of separation" may be viewed as a physical distance between clients or more precisely a measure of RF proximity that may depend on physical distance as well as other obstacles that affect path loss between the clients. Thus, the measure of separation is not always based solely on physical distance.

In asymmetric situations where one client is closer to the AP and another client is farther away from the AP, the AP may decide to use a lower DL transmit power when transmitting to the client that is closer in order to improve UL signal-to-interference-plus-noise ratio (SINR), by reducing self-interference, with respect to the reception of the UL transmission. Conversely, the AP may use a higher DL transmit power when transmitting to the further client to improve DL SINR at that client. In other words, depending on the relative separation of the clients with respect to the AP, the AP may control the power used for a DL transmission to a client in order to (a) improve receive SINR at the AP for an UL transmission from another client (which could be a weaker signal), and (b) improve receive SINR at the client that is receiving the DL transmission from the AP.

Cascaded Sequence

Figure 3:
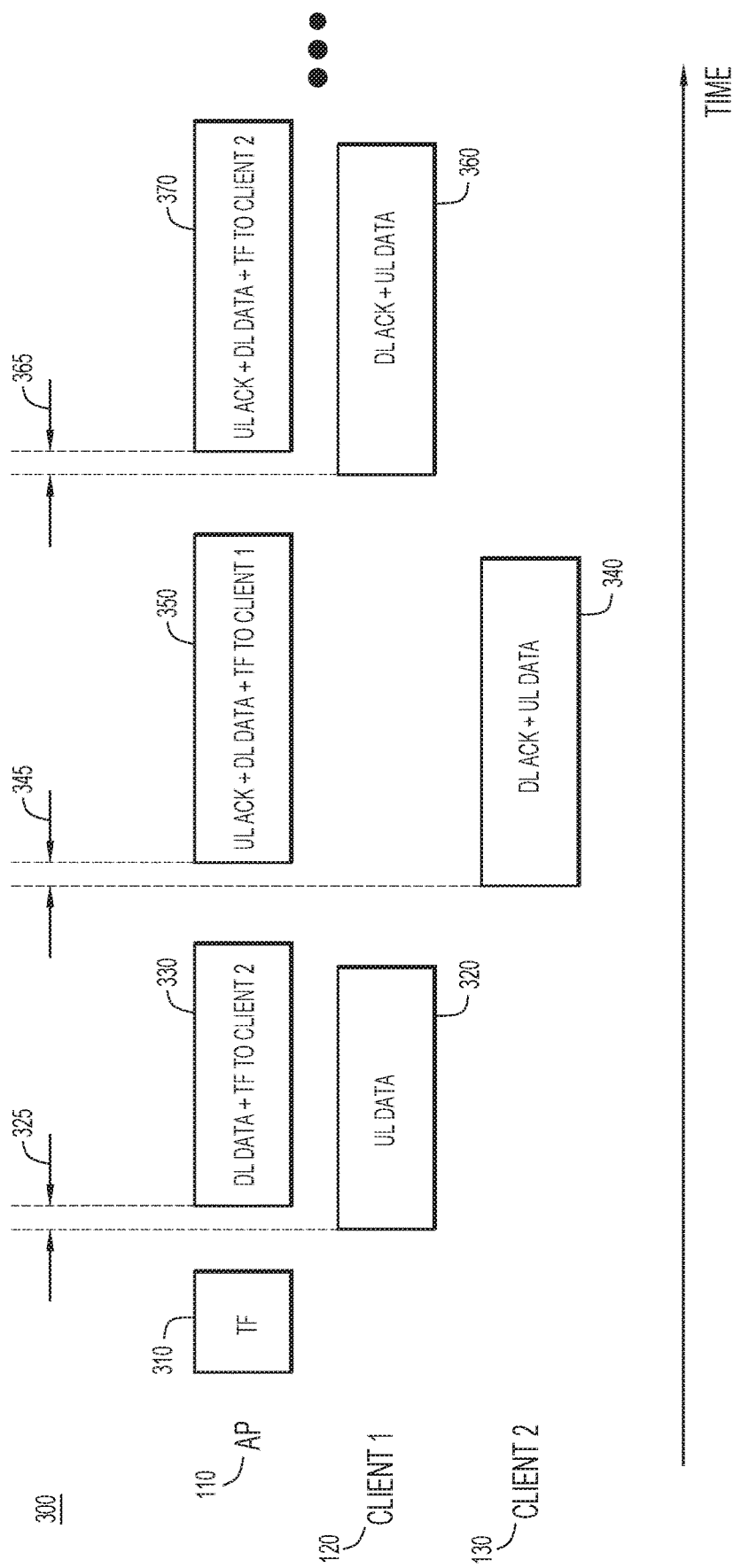
FIG. 3 illustrates a frame sequence of transmissions initiated by the access point to invoke a cascaded form of implicit full-duplex communication with two wireless client devices, according to an example embodiment.

The scheme described above in connection with FIGS. 1 and 2 may be extended to incorporate the cascading sequence feature of IEEE 802.11ax, for example, to alternate between client 1 and client 2 in full-duplex mode. To this end, reference is now made to FIG. 3. FIG. 3 shows a frame sequence 300 that is similar to that shown in FIG. 2, but is adapted for the cascading sequence feature.

Included in each DL transmission is the trigger frame that schedules the following uplink transmission. Moreover, included in each UL transmission may be an acknowledgement (ACK) for the previously transmitted DL frame, and vice versa. Alternatively, Block ACKs may be transmitted and collected at a future time.

More specifically, as shown in FIG. 3, the frame sequence 300 starts with the AP sending a TF 310 to client 120, triggering client 120 to send an UL transmission 320 that includes UL data to the AP. After a delay interval 325, the AP 110 sends to client 122 a DL transmission 330 that includes DL data and a TF to client 122. The delay interval 325 allows time for the client 120 to initiate UL transmission 320 without energy on the channel from the DL transmission 330 that would otherwise cause the client 120 to refrain from transmitting due to CCA. Client 122 receives the DL transmission 330 and, in reply, sends to the AP 110 an UL transmission 340 that includes both a DL ACK (to DL data of DL transmission 330) and UL data.

After a delay interval 345, the AP 110 sends to client 120 a DL transmission 350 that includes an UL ACK to acknowledge receipt of the UL data of UL transmission 320, DL data for client 120 and a TF for client 120. Again, the delay interval 345 allows time for client 122 to initiate UL transmission 340 (triggered by the TF included in DL transmission 330) that would otherwise cause client 122 to refrain from transmitting due to CCA. Client 120 receives the DL transmission 350 and, in reply, sends to the AP 110 an UL transmission 360 that includes a DL ACK (to DL data of DL frame transmission) and UL data.

Again, after a delay interval 365, the AP sends to client 122 a DL transmission 370 that includes a UL ACK (to UL data of UL transmission 340), DL data and a TF to client 122. The delay interval 365 allows time for client 120 to initiate UL transmission 360 (triggered by the TF included in DL frame 35) that would otherwise cause client 120 to refrain from transmitting due to CCA.

The cascading flip-flop sequence can continue for as long as the AP 110 and clients 120 and 122 have data to send to each other.

In order to prevent potential disruptions by transmissions from other devices in the spectrum, the AP 110 may reserve the medium using one of many tools provided by IEEE specifications, such as Clear-to-Send to Self, etc.

Ensuring Client Separation

As mentioned above, successful downlink communication in this method may rely on low interference experienced by the two clients. It may be desirable to ensure that the two clients are sufficiently separated such that they do not interfere with each other. Various methods may be employed for ensuring sufficient client separation and thus that two clients are good candidates for this method.

First, during previous operations, an AP senses UL collisions occurring among two clients. The AP may conclude/determine that the two clients receive each other transmissions at least below an ED threshold (such as −62 dB), likely below CCA Preamble Detection (PD) of −82. The AP adds this information to an estimate of a client's received signal strength from the AP (obtained through means such as beacon reports), and obtains a lower bound on the SINR experienced by the DL client. In this way, the AP can detect whether there are collisions over-the-air between the transmissions from multiple clients. If the AP determines that the two clients transmitted at the same time, this means that the two clients did not defer to each other (using CCA), which in turn means that the two clients have at least a certain minimum separation (either in a physical distance sense or RF path loss sense) between each other. Thus, clients that do not defer to each other are good candidates to participate in this full-duplex method.

Second, if the AP determines that there are no over-the-air collisions between the clients' transmissions, the AP may actively probe the two clients by transmitting a Request-to-Send (RTS) frame to one client while receiving a transmission from the other client. By actively sending an RTS frame to one of the clients and determining whether the other client transmits a Clear-to-Send (CTS) frame, the AP may then verify that the transmissions from the two clients are not interfering with each other, and thus the two clients are good candidates to participate in this full-duplex method.

Third, location-based techniques, such as, those utilizing Fine Time Measurement (FTM) ranging and/or angle-of-arrival (along with UL RSSI) may be used to derive a measure of separation between the clients. Any RF based location technique now known or hereinafter developed may be used to derive the measure of separation.

Fourth, standards-based protocols (such as Measurement Request/Report or type Frame Request/Report of IEEE 802.11k) or vendor-specific configurations, in which clients measure received signals from other clients and report to the AP, may be used to enable the AP to determine whether two clients are good candidates to participate in this full-duplex method. Also, IEEE 802.11ax sounding reports may be used in a similar manner. In sum, there are many ways for an AP to learn how a client is receiving signals from the AP, and inferring how a client is receiving signals from another client. The AP may employ these methods to determine whether two clients are good candidates to participate in this full-duplex method.

Multi-User Transmissions

The AP may find two clusters of clients that are separated from each other to schedule Multi-User (MU) transmissions in both the UL and the DL. This is shown in an example arrangement in FIGS. 4 and 5. The AP may use multi-user multiple-input multiple-output (MU-MIMO) techniques that involve sending multiple downlink transmissions simultaneously to multiple clients using MIMO beamforming or other antenna processing techniques, as well as receiving multiple uplink transmissions sent simultaneously from multiple clients to the AP.

Figure 4:
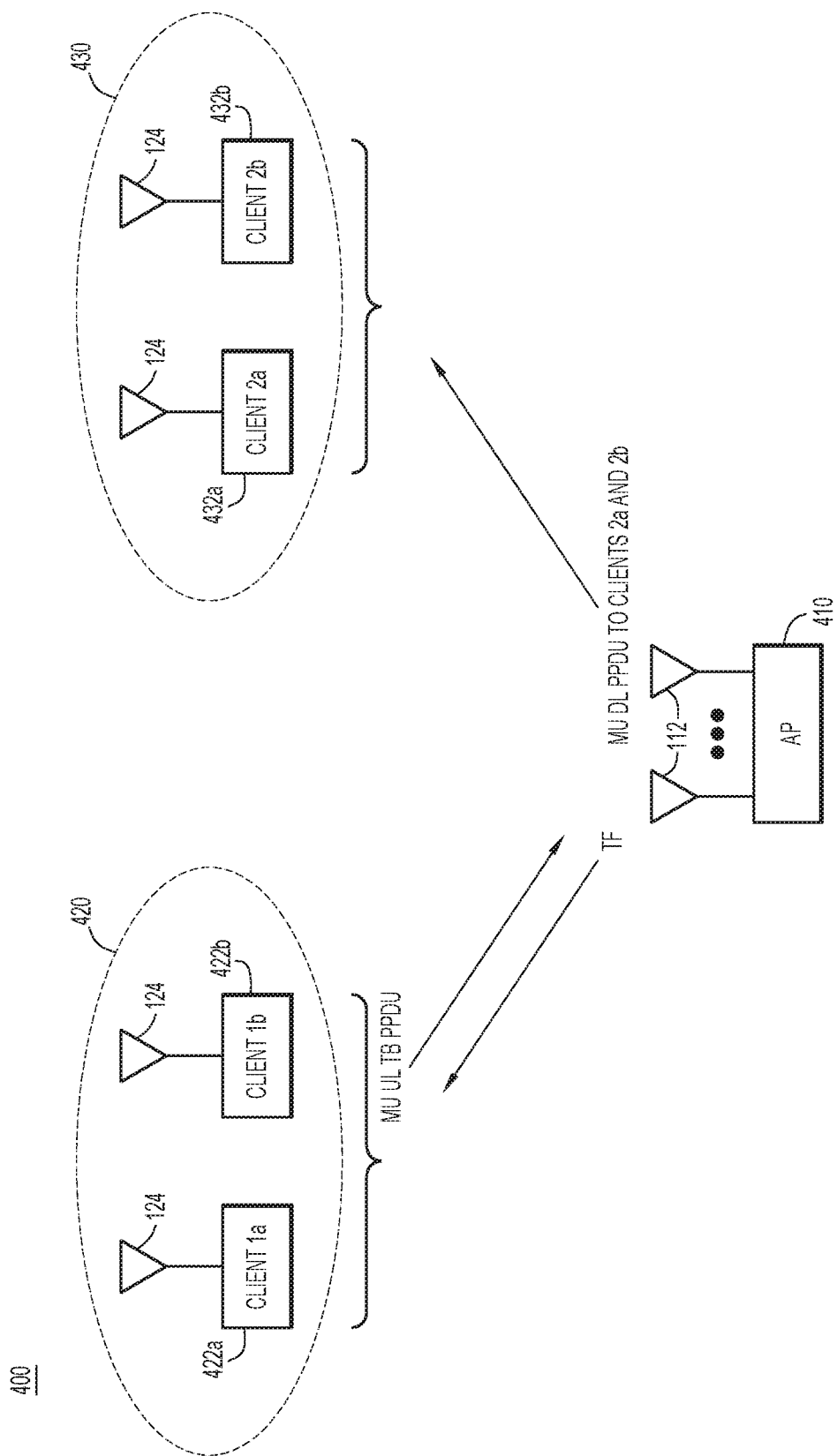
FIG. 4 is a diagram of a wireless local area network that includes two clusters of wireless client devices and depicting application of the implicit full-duplex communication techniques to multi-user wireless communication, according to an example embodiment.
Figure 5:
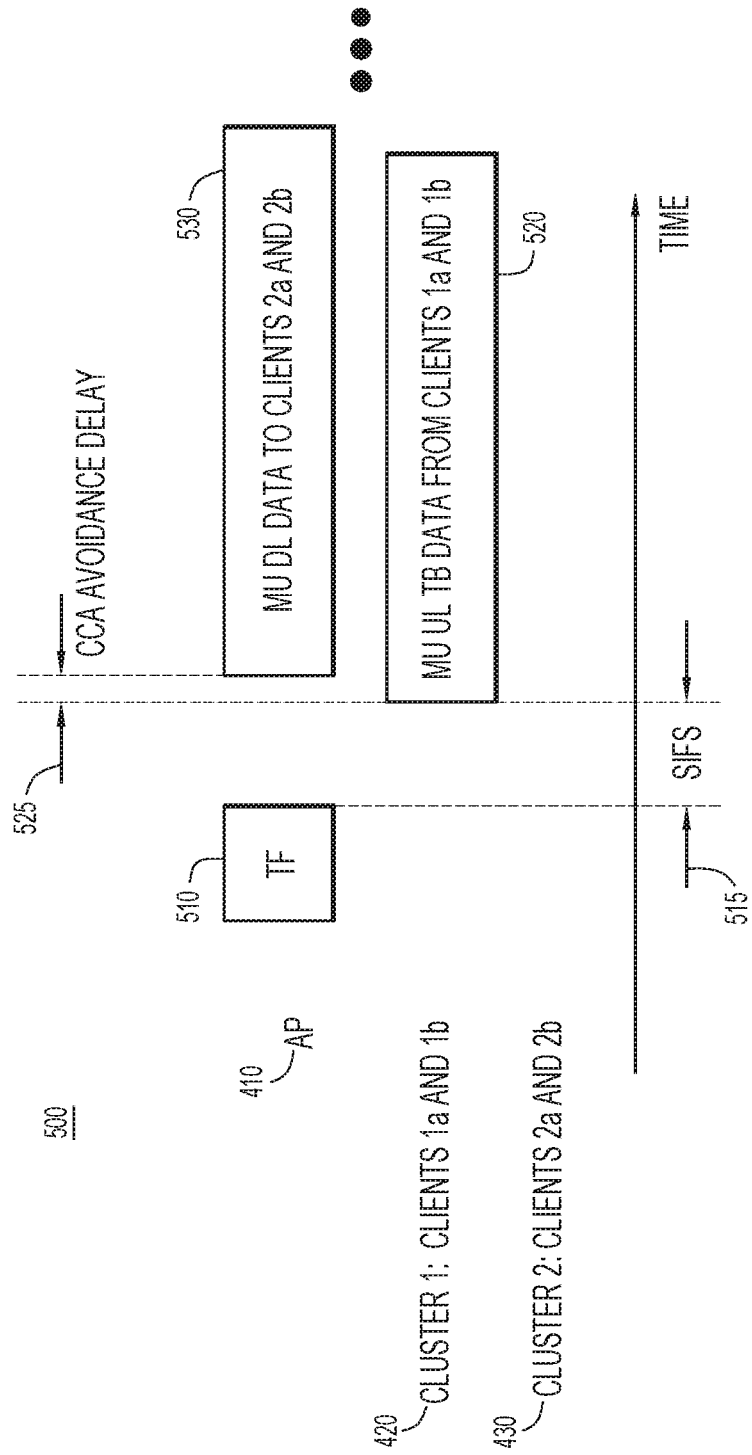
FIG. 5 illustrates a diagram, similar to that of FIG. 2, but illustrating a sequence of transmissions initiated by the access point to invoke implicit full-duplex communication with two clusters wireless client devices for the example wireless local area network arrangement shown in FIG. 4, according to an example embodiment.

FIG. 4 shows a WLAN 400 that includes AP 410, a first cluster 420 that includes multiple clients and a second cluster 430 that includes multiple clients. FIG. 5 shows the frame sequence 500 for MU transmissions. In one example, first cluster 420 includes clients 422a and 422b (clients 1a and 1b, respectively), and the second cluster 430 includes clients 432a and 432b (clients 2a and 2b, respectively).

At 510, the AP 410 sends a TF to the first cluster 420 of clients, clients 1a and 1b. After an SIFS interval 515, clients 1a and 1b coordinate to send a MU UL transmission 520 that consists of MU trigger-based UL data from clients 1a and 1b. After a delay interval 525, the AP 410 sends a MU DL transmission 530 to clients 2a and 2b in the second cluster 430. The MU DL frame includes DL data for both clients 2a and 2b.

This process depicted in FIG. 5 may continue in a similar manner to trigger clients 1a and 1b to send a MU UL transmission while the AP sends a MU DL transmission to clients 2a and 2b, or vice versa, whereby the AP triggers clients 2a and 2b to send a MU UL transmission while the AP sends a MU DL transmission to clients 1a and 1b.

Moreover, the concepts of the cascaded frame sequence depicted in FIG. 3 may be applied to the multi-user scenario of FIGS. 4 and 5.

Figure 6:
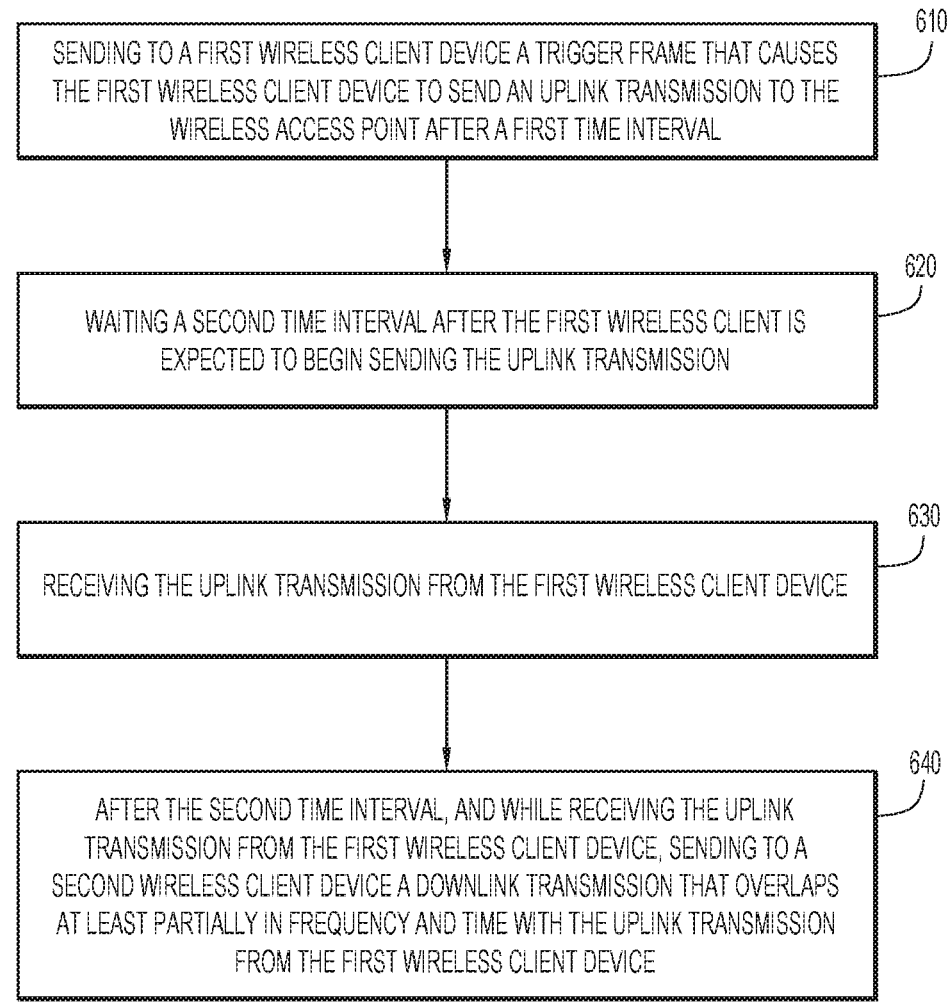
FIG. 6 is a flow chart depicting a method of operations performed by a wireless access point device to perform the implicit full-duplex communication techniques presented herein, according to an example embodiment.

Reference is now made to FIG. 6, which illustrates a flow chart depicting a method 600 performed by an AP, according to the example embodiments presented herein. The method 600 is performed by an AP that is full-duplex capable and that serves wireless communication for at least a first wireless client device and a second wireless client device. At 610, the AP sends to the first wireless client device a trigger frame that causes the first wireless client device to send an uplink transmission to the wireless access point after a first time interval. The first time interval is, for example, the aforementioned SIFS interval referred to in connection with FIGS. 2, 3 and 5. At 620, the AP waits a second time interval after the first wireless client is expected to begin sending the uplink transmission. This second time interval is, for example, the aforementioned CCA avoidance delay interval referred to in connection with FIGS. 2, 3 and 5.

At 630, the AP receives the uplink transmission from the first wireless client device.

At 640, after the second interval of time, and while receiving the uplink transmission from the first wireless client device, the AP sends to the second wireless client device a downlink transmission that overlaps at least partially in frequency and time with the uplink transmission from the first wireless client device.

The method 600 may further include determining whether to wait the second time interval before sending the downlink transmission based on a duration of the uplink transmission to be sent by the first wireless client device. That is, since the AP knows the length/duration of a trigger-based response from a client, the AP can decide whether or not it needs to invoke the CCA delay interval before initiating a downlink transmission to another client.

Furthermore, the method 600 may further include determining a power level to use for the downlink transmission (to the second wireless client device) based on a measure of separation between the first wireless client device and the second wireless client device as well as a separation between the second wireless client device and the wireless access point device.

As described above, the method 600 may further include determining a measure of separation between the first wireless client device and the second wireless client device; and based on the measure of separation, determining whether the first wireless client device and the second wireless client device are good pair candidates for overlapping downlink transmissions and uplink transmissions.

In one form, the operation of determining the measure of separation may be based on whether the first wireless client device and the second wireless client device send uplink transmissions at the same time to the wireless access point device indicating that the first wireless client device and the second wireless client device do not defer to each other based on a clear channel access determination, which in turn indicates that the first wireless client device and the second wireless client device have at least a minimum separation from each other.

In another form, the operation of determining the measure of separation includes: sending a Request-to-Send frame to the second wireless client device while receiving the uplink transmission from the first wireless client device; determining whether the second wireless client device transmits a Clear-to-Send frame in response to the Request-to-Send frame; and if the Clear-to-Send frame is received from the second wireless client device, declaring that transmissions from the first wireless client device and the second wireless client device are not interfering with each other.

In yet another form, the operation of determining the measure of separation includes employing one or more location-based techniques based on transmissions made by the first wireless client device and by the second wireless client device.

In still another form, the operation of determining the measure of separation includes obtaining from the first wireless client device and the second wireless client device, reports indicating measurements of strength of reception of transmissions from each other.

Furthermore, as described above in connection with FIG. 3, the method 600 may include performing a cascaded sequence comprising: including in the downlink transmission to the second wireless client device a trigger frame that causes the second wireless client device to send an uplink transmission to the wireless access point device after the first time interval; receiving the uplink transmission from the second wireless client device; and after the second time interval, and while receiving the uplink transmission from the second wireless client device, sending to the first wireless client device a downlink transmission that overlaps at least partially in frequency and time with the uplink transmission from the second wireless client device, wherein the downlink transmission to the first wireless client device includes a trigger frame that causes the first wireless client device to send an uplink transmission to the wireless access point device after the first time interval.

The performing of the cascaded sequence may further includes: receiving from the first wireless client device an uplink transmission sent in response to the trigger frame included in the downlink transmission sent by the wireless access point device; and after the second time interval, and while receiving the uplink transmission from the first wireless client device, sending to the second wireless client device a downlink transmission that overlaps at least partially in frequency and time with the uplink transmission from the first wireless client device, wherein the downlink transmission to the second wireless client device includes a trigger frame that causes the second wireless client device to send an uplink transmission to the wireless access point device after the first time interval.

Furthermore, the downlink transmission sent to the first wireless client device further may include an acknowledgement indicating reception by the wireless access point device of the uplink transmission sent by the first wireless client device and the downlink transmission sent to the second wireless client device further includes an acknowledgment indicating reception by the wireless access point device of the uplink transmission sent by the second wireless client device.

As described above in connection with FIG. 3, the operation 610 of sending the trigger frame may include sending a multi-user trigger frame to a first cluster of wireless client devices to cause multiple wireless client devices in the first cluster to send a multi-user uplink transmission to the wireless access point after the first time interval; the operation 630 of receiving may include receiving the multi-user uplink transmission from the multiple wireless client devices in the first cluster; and the operation 640 of sending the downlink transmission may include sending a multi-user downlink transmission to multiple clients in a second cluster of wireless client devices.

Figure 7:
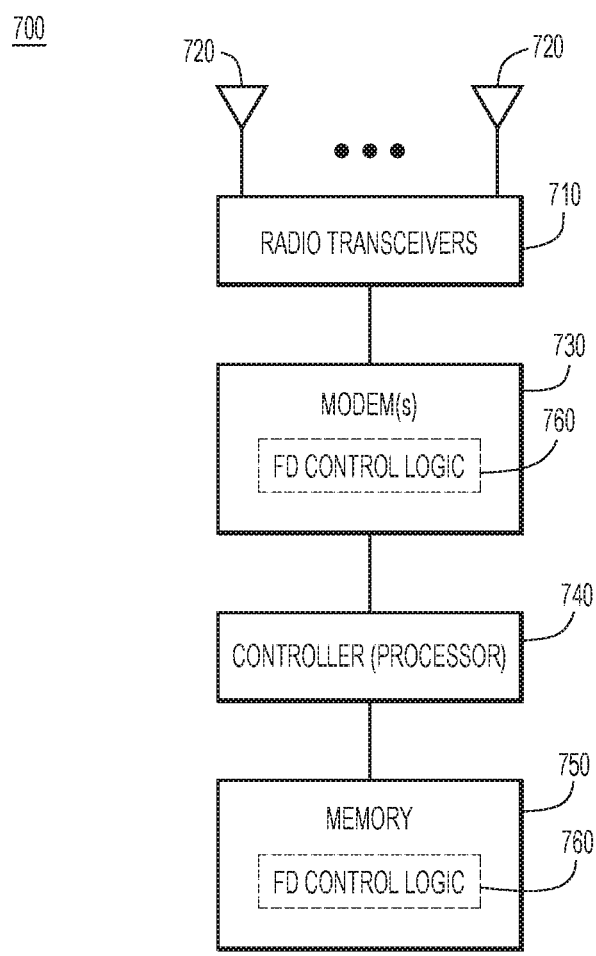
FIG. 7 is a block diagram of a wireless access point device that may be configured to perform the implicit full-duplex communication techniques presented herein, according to an example embodiment.

Reference is now made to FIG. 7. FIG. 7 shows a block diagram of a wireless device 700 (e.g., AP 110) configured to operate in accordance with the embodiments presented herein. The wireless device includes 700 includes a radio transceiver 710 (or multiple radio transceivers), one or more antennas 720, a modem 730 (or multiple modems), a controller (e.g., a microprocessor) 740 and memory 750. The modem 730 may be configured with full-duplex (FD) control logic 760 to control operation of the wireless device 700. Alternatively, the memory 750 may store software instructions for full-duplex (FD) control logic 760 that, when executed by the controller 740, cause the controller 740 to execute the full-duplex operations described herein in connection with FIGS. 1-6 on behalf of the wireless device 700.

In one form, the operations of the FD control logic 760 may be embodied by digital logic in an Application Specific Integrated Circuit (ASIC) or field programmable gate array, or other logic configurable device.

The wireless device 700 has the capability to receive while transmitting at the same time on the same channel, as well as the capability to cancel self-interference (caused by receiving energy from its own transmission) by looping the transmitted signal back to the receiver. To this end, the radio transceivers 710 and/or modem(s) 730 are configured to perform this cancel self-interference. There are many techniques for canceling self-interference that are known in the art which may be used by the wireless device 700.

The memory 750 may comprise read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller 740) it is operable to perform the operations described herein.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided that is performed at a wireless access point device that is full-duplex capable and that serves wireless communication for at least a first wireless client device and a second wireless client device, including: sending to the first wireless client device a trigger frame that causes the first wireless client device to send an uplink transmission to the wireless access point device after a first time interval; waiting a second time interval after the first wireless client device is expected to begin sending the uplink transmission; receiving the uplink transmission from the first wireless client device; and after the second time interval, and while receiving the uplink transmission from the first wireless client device, sending to the second wireless client device a downlink transmission that overlaps at least partially in frequency and time with the uplink transmission from the first wireless client device.

In another form, an apparatus is provided comprising: one or more wireless transceivers; one or more modems coupled to the wireless transceivers; a controller configured to cause the apparatus to perform operations including: send to a first wireless device a trigger frame that causes the first wireless device to send an uplink transmission to the apparatus after a first time interval; waiting a second time interval after the first wireless device is expected to begin sending the uplink transmission; receiving the uplink transmission from the first wireless device; and after the second time interval, and while receiving the uplink transmission from the first wireless device, sending to a second wireless device a downlink transmission that overlaps at least partially in frequency and time with the uplink transmission from the first wireless device.

In still another form, one or more non-transitory computer readable storage media are provided, encoded with instructions that, when executed by a processor, cause the processor to perform operations on behalf of a wireless access point device that is full-duplex capable and that serves wireless communication for at least a first wireless client device and a second wireless client device, the operations including: sending to the first wireless client device a trigger frame that causes the first wireless client device to send an uplink transmission to the wireless access point after a first time interval; waiting a second time interval after the first wireless client device is expected to begin sending the uplink transmission; receiving the uplink transmission from the first wireless client device; and after the second time interval, and while receiving the uplink transmission from the first wireless client device, sending to the second wireless client device a downlink transmission that overlaps at least partially in frequency and time with the uplink transmission from the first wireless client device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a wireless access point device that is full-duplex capable and that serves wireless communication for at least a first wireless client device and a second wireless client device:
   sending to the first wireless client device a trigger frame that causes the first wireless client device to send an uplink transmission to the wireless access point device after a first time interval;
   waiting a second time interval after the first wireless client device is expected to begin sending the uplink transmission;
   receiving the uplink transmission from the first wireless client device; and
   after the second time interval, and while receiving the uplink transmission from the first wireless client device, sending to the second wireless client device a downlink transmission that overlaps at least partially in frequency and time with the uplink transmission from the first wireless client device.

2. The method of claim 1, further comprising determining whether to wait the second time interval before sending the downlink transmission based on a duration of the uplink transmission to be sent by the first wireless client device.

3. The method of claim 1, further comprising determining a power level to use for the downlink transmission based on a measure of separation between the first wireless client device and the second wireless client device as well as a separation between the second wireless client device and the wireless access point device.

4. The method of claim 1, further comprising:
   determining a measure of separation between the first wireless client device and the second wireless client device; and
   based on the measure of separation, determining whether the first wireless client device and the second wireless client device are good pair candidates for overlapping downlink transmissions and uplink transmissions.

5. The method of claim 4, wherein determining the measure of separation is based on whether the first wireless client device and the second wireless client device send uplink transmissions at the same time to the wireless access point device indicating that the first wireless client device and the second wireless client device do not defer to each other based on a clear channel access determination, which in turn indicates that the first wireless client device and the second wireless client device have at least a minimum separation from each other.

6. The method of claim 4, wherein determining the measure of separation includes:
   sending a Request-to-Send frame to the second wireless client device while receiving the uplink transmission from the first wireless client device;
   determining whether the second wireless client device transmits a Clear-to-Send frame in response to the Request-to-Send frame; and
   if the Clear-to-Send frame is received from the second wireless client device, declaring that transmissions from the first wireless client device and the second wireless client device are not interfering with each other.

7. The method of claim 4, wherein determining the measure of separation includes employing one or more location-based techniques based on transmissions made by the first wireless client device and by the second wireless client device.

8. The method of claim 4, wherein determining the measure of separation includes obtaining from the first wireless client device and the second wireless client device, reports indicating measurements of strength of reception of transmissions from each other.

9. The method of claim 1, further comprising performing a cascaded sequence comprising:
   including in the downlink transmission to the second wireless client device a trigger frame that causes the second wireless client device to send an uplink transmission to the wireless access point device after the first time interval;
   receiving the uplink transmission from the second wireless client device; and after the second time interval, and while receiving the uplink transmission from the second wireless client device, sending to the first wireless client device a downlink transmission that overlaps at least partially in frequency and time with the uplink transmission from the second wireless client device, wherein the downlink transmission to the first wireless client device includes a trigger frame that causes the first wireless client device to send an uplink transmission to the wireless access point device after the first time interval.

10. The method of claim 9, wherein performing the cascaded sequence further includes:
receiving from the first wireless client device an uplink transmission sent in response to the trigger frame included in the downlink transmission sent by the wireless access point device; and
after the second time interval, and while receiving the uplink transmission from the first wireless client device, sending to the second wireless client device a downlink transmission that overlaps at least partially in frequency and time with the uplink transmission from the first wireless client device, wherein the downlink transmission to the second wireless client device includes a trigger frame that causes the second wireless client device to send an uplink transmission to the wireless access point device after the first time interval.

11. The method of claim 10, wherein the downlink transmission sent to the first wireless client device further includes an acknowledgement indicating reception by the wireless access point device of the uplink transmission sent by the first wireless client device and the downlink transmission sent to the second wireless client device further includes an acknowledgment indicating reception by the wireless access point device of the uplink transmission sent by the second wireless client device.

12. The method of claim 1, wherein:
sending the trigger frame comprises sending a multi-user trigger frame to a first cluster of wireless client devices to cause multiple wireless client devices in the first cluster to send a multi-user uplink transmission to the wireless access point device after the first time interval;
receiving comprises receiving the multi-user uplink transmission from the multiple wireless client devices in the first cluster; and
sending the downlink transmission comprises sending a multi-user downlink transmission to multiple clients in a second cluster of wireless client devices.

13. An apparatus comprising:
one or more wireless transceivers;
one or more modems coupled to the wireless transceivers;
a controller configured to cause the apparatus to perform operations including:
sending to a first wireless device a trigger frame that causes the first wireless device to send an uplink transmission to the apparatus after a first time interval;
waiting a second time interval after the first wireless device is expected to begin sending the uplink transmission;
receiving the uplink transmission from the first wireless device; and
after the second time interval, and while receiving the uplink transmission from the first wireless device, sending to a second wireless device a downlink transmission that overlaps at least partially in frequency and time with the uplink transmission from the first wireless device.

14. The apparatus of claim 13, wherein the controller is further configured to determine whether to wait the second time interval before sending the downlink transmission based on a duration of the uplink transmission to be sent by the first wireless device.

15. The apparatus of claim 13, wherein the controller is further configured to perform operations including:
determining a measure of separation between the first wireless device and the second wireless device; and
based on the measure of separation, determining whether the first wireless device and the second wireless device are good pair candidates for overlapping downlink transmissions and uplink transmissions.

16. The apparatus of claim 13, wherein the controller is configured to perform a cascaded sequence comprising:
including in the downlink transmission to the second wireless device a trigger frame that causes the second wireless device to send an uplink transmission to the apparatus after the first time interval;
receiving the uplink transmission from the second wireless device; and
after the second time interval, and while receiving the uplink transmission from the second wireless device, sending to the first wireless device a downlink transmission that overlaps at least partially in frequency and time with the uplink transmission from the second wireless device, wherein the downlink transmission to the first wireless device includes a trigger frame that causes the first wireless device to send an uplink transmission to the apparatus after the first time interval.

17. The apparatus of claim 16, wherein the controller is further configured to perform the cascaded sequence by:
receiving from the first wireless device an uplink transmission sent in response to the trigger frame included in the downlink transmission sent by the apparatus; and
after the second time interval, and while receiving the uplink transmission from the first wireless device, sending to the second wireless device a downlink transmission that overlaps at least partially in frequency and time with the uplink transmission from the first wireless device, wherein the downlink transmission to the second wireless device includes a trigger frame that causes the second wireless device to send an uplink transmission to the apparatus after the first time interval.

18. One or more non-transitory computer readable storage media encoded with instructions that, when executed by a processor, cause the processor to perform operations on behalf of a wireless access point device that is full-duplex capable and that serves wireless communication for at least a first wireless client device and a second wireless client device, the operations including:
sending to the first wireless client device a trigger frame that causes the first wireless client device to send an uplink transmission to the wireless access point device after a first time interval;
waiting a second time interval after the first wireless client device is expected to begin sending the uplink transmission;
receiving the uplink transmission from the first wireless client device; and
after the second time interval, and while receiving the uplink transmission from the first wireless client device, sending to the second wireless client device a downlink transmission that overlaps at least partially in frequency and time with the uplink transmission from the first wireless client device.

19. The one or more non-transitory computer readable storage media of claim 18, further comprising instructions for performing operations including:
   determining a measure of separation between the first wireless client device and the second wireless client device; and
   based on the measure of separation, determining whether the first wireless client device and the second wireless client device are good pair candidates for overlapping downlink transmissions and uplink transmissions.

20. The one or more non-transitory computer readable storage media of claim 18, further comprising instructions for performing operations for a cascaded sequence comprising:
   including in the downlink transmission to the second wireless client device a trigger frame that causes the second wireless client device to send an uplink transmission to the wireless access point device after the first time interval;

receiving the uplink transmission from the second wireless client device; and after the second time interval, and while receiving the uplink transmission from the second wireless client device, sending to the first wireless client device a downlink transmission that overlaps at least partially in frequency and time with the uplink transmission from the second wireless client device, wherein the downlink transmission to the first wireless client device includes a trigger frame that causes the first wireless client device to send an uplink transmission to the wireless access point device after the first time interval.

* * * * *